United States Patent
Pandey et al.

(10) Patent No.: US 11,290,855 B1
(45) Date of Patent: Mar. 29, 2022

(54) INSTANCE-BASED MESSAGE DELIVERY

(71) Applicant: T-Mobile USA, Inc., Bellevue, WA (US)

(72) Inventors: Sudhanshu Pandey, Sammamish, WA (US); Raghavendra Kulkarni, Redmond, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/036,464

(22) Filed: Sep. 29, 2020

(51) Int. Cl.
| | |
|---|---|
| *G06F 15/16* | (2006.01) |
| *H04W 4/14* | (2009.01) |
| *H04L 67/10* | (2022.01) |
| *H04L 67/01* | (2022.01) |
| *H04W 88/02* | (2009.01) |
| *H04L 67/62* | (2022.01) |

(52) U.S. Cl.
CPC ......... *H04W 4/14* (2013.01); *H04L 29/08963* (2013.01); *H04L 67/10* (2013.01); *H04L 67/42* (2013.01); *H04W 88/023* (2013.01); *G05B 2219/25218* (2013.01)

(58) Field of Classification Search
CPC .................. H04W 4/14; H04W 88/023; H04L 29/08963; H04L 67/10; H04L 67/42
USPC .......................................... 709/232, 206, 230
See application file for complete search history.

(56) References Cited

U.S. PATENT DOCUMENTS

| | | | |
|---|---|---|---|
| 2004/0264654 A1* | 12/2004 | Reding ................. | H04M 15/09 379/88.12 |
| 2005/0018820 A1* | 1/2005 | Chaddha ............. | H04M 3/5307 379/88.13 |
| 2005/0086326 A1* | 4/2005 | Manning ................ | H04L 67/06 709/219 |
| 2005/0164721 A1* | 7/2005 | Eric Yeh ................ | H04W 4/14 455/466 |
| 2010/0315240 A1* | 12/2010 | Lin ........................ | H04L 67/26 340/573.1 |
| 2011/0317684 A1* | 12/2011 | Lazzaro .............. | H04L 65/1069 370/352 |
| 2012/0042026 A1* | 2/2012 | Park ..................... | H04L 51/043 709/206 |
| 2012/0282953 A1* | 11/2012 | Butler, Sr. ............. | H04L 51/38 455/466 |
| 2018/0063213 A1* | 3/2018 | Bevilacqua-Linn ........................ H04N 21/64322 |

OTHER PUBLICATIONS

John, Steven. "How to Schedule a Text Message on Your IPhone Using the Third-Party Scheduled App." Business Insider, Business Insider, Sep. 11, 2019, www.businessinsider.com/how-to-schedule-a-text-message-on-iphone. (Year: 2019).*

(Continued)

*Primary Examiner* — Kaylee J Huang
(74) *Attorney, Agent, or Firm* — Lane Powell PC

(57) ABSTRACT

Techniques and architectures enable a wireless communications system to receive and deliver a message for which a user of a mobile device has specified which among multiple devices, all assigned the same phone number as one another, is to receive the message. The mobile device may be the sender or the receiver of the message. The message may be a scheduled message to be delivered on a particular date and time to a contact in an address book of the sender.

14 Claims, 8 Drawing Sheets

(56) References Cited

OTHER PUBLICATIONS

Montejo, Elmer. "AT&T to Let You Use One Phone Number for Multiple Devices." Techlicious, Techlicious, LLC, Oct. 16, 2015, www.techlicious.com/blog/att-ready-to-launch-tech-for-multi-device-phone-number-sharing/. (Year: 2015).*

* cited by examiner

INSTANCE-BASED MESSAGE DELIVERY

BACKGROUND

Short Message Service (SMS) allows users to exchange text messages between capable mobile phones and other devices within a wireless communications network. Generally, text messages are sent to an SMS Center (SMSC). The wireless communications network may include multiple SMSCs to manage the receipt, storage, and forwarding of text messages.

SMS may feature message delivery confirmation so that the sender can receive a return message notifying them whether the message has been delivered. SMS messages may be sent and received simultaneously with Global System for Mobile Communications (GSM) voice, data, and fax calls. This is possible because SMS messages are sent using a signaling path and not a dedicated radio channel.

Multimedia Messaging Service (MMS) allows users to exchange multimedia communications between capable mobile phones and other devices. MMS is an extension of the SMS protocol and defines a way to send and receive messages that include images, audio, and video in addition to text.

A feature named "Digits," provided by T-Mobile USA, Inc., Bellevue, Wash., generally allows a single phone number to work across virtually all connected devices of a user. For example, a text message sent to a particular phone number assigned to a user may be sent to all or a portion of devices, such as phones, tablets, wearables, or computers of the user.

Users of such messaging services may benefit from features that allow for increased control over some aspects of message delivery.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
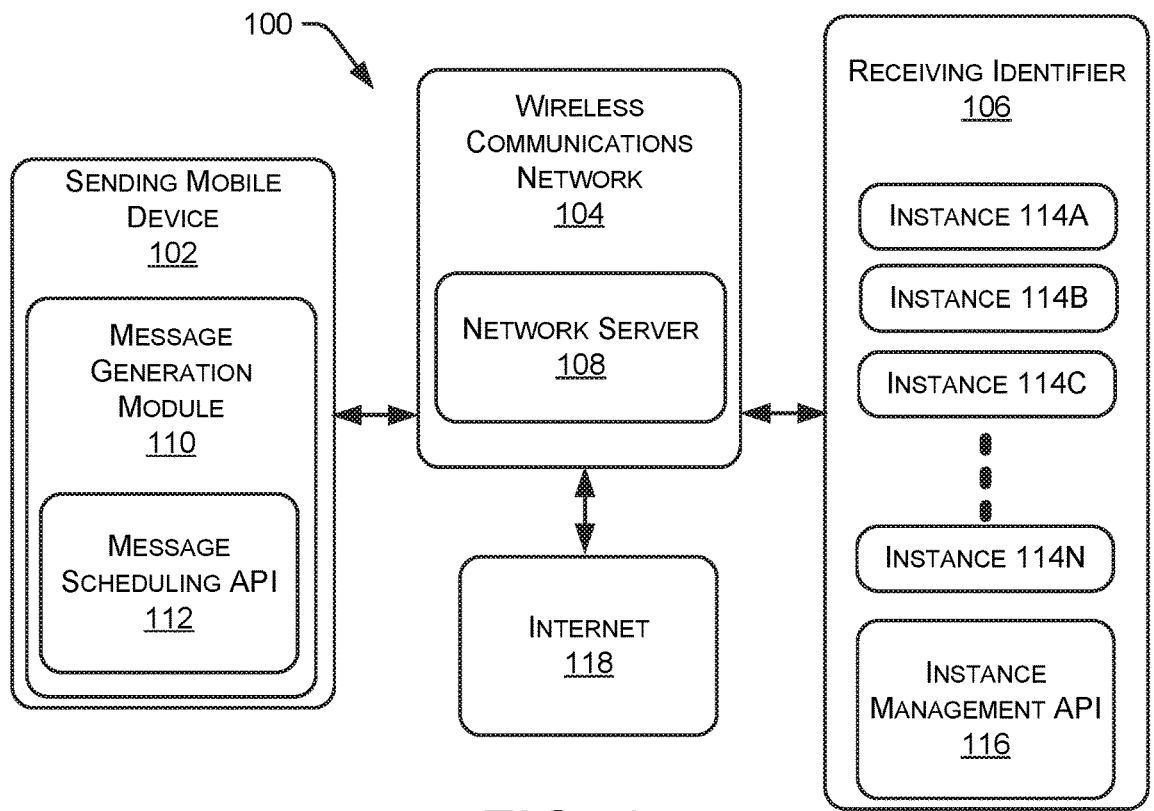
FIG. 1 is a block diagram of a system for instance-based message delivery, according to various embodiments.

Described herein are techniques and architectures for enabling a wireless communications system to receive and transmit messages, such as text messages (e.g., via Short Message Service or SMS), for which senders or receivers of the text messages have specified by request to be delivered to a particular device (e.g., a remote client device). Further, such techniques and architectures may allow for the system to store the messages, in the case of scheduled message delivery, and to deliver the messages at the scheduled time to the particular device specified by the request, which may be time-sensitive. For example, a request for a message to be received by a particular device may include a time or time span for when the request is valid or to be implemented.

The wireless communications system may provide a feature where a single phone number is assigned to multiple devices of a client (e.g., a user). In such a case, a message sent to this phone number may be received on all of the multiple devices. An example of such a feature is "Digits," which is offered by T-Mobile USA, Inc., of Bellevue, Wash., though claimed subject matter is not limited to this example feature. Each of the multiple devices is referred to as an "instance." Examples of devices include phones, tablets, wearables (e.g., watches, glasses, and so on), or computers. Thus, an instance of a user having an assigned phone number for their devices may be a phone, whereas another instance may be another phone of the user, both phones being assigned the same phone number. In various embodiments, a user may select a particular instance for receiving messages. In such a case, other instances may not receive the messages. In some implementations, a user may select more than one instance for receiving messages. In such a case, instances other than those selected may not receive the messages. As mentioned above, a user selection may additionally specify a time or time span for when to apply the selection. For example, a user may select, among the user's multiple devices, his tablet to receive messages during the following two hours (e.g. or other time span), or on May 9 (e.g., or other day, week, month, and so on). In the latter specific example, all messages delivered to the user's assigned phone number on May 9 will be delivered only to the user's tablet.

In some embodiments, a sender of a message may request a particular instance, or type of instance, of the intended receiver to which the message is to be delivered. For example, a sender, preferring that their message be delivered to a desktop computer, may request an instance corresponding to the receiver's desktop computer for receiving their message. This may provide an advantage, for example, by allowing a message to be received by an appropriate device, which may be a device that is most capable or most efficient to receive and render the message and its contents. For a particular example, a message may include a multimedia attachment comprising high-resolution video that is best viewed on a device capable of rendering high-resolution video. Thus, the sender of the message may request that their message be delivered to an instance of the receiver that has such capability. In some situations of message delivery, a request for a receiving instance by a sender may conflict with the selection of the instance by the receiver. Such situations are discussed below.

A scheduled message (e.g., a message scheduled for delivery) may be generated by a user (e.g., sender) of a device interacting with an application to create a message and select a date or time for when the message is to be delivered to one or more recipients. The user may generate the scheduled message to be delivered, for example, minutes, hours, days, weeks, months, or years later. Subsequently, the scheduled message may be stored by a network, such as that of the wireless communications system, for a time span corresponding to the delivery schedule (e.g., the amount of time a message is stored before its delivery to the recipient).

In some embodiments, if a sender produced a scheduled message to be delivered to a recipient (e.g., a phone number assigned to multiple instances) at a time when the recipient selected a particular instance for receiving messages then, accordingly, the scheduled message will be received by the selected particular instance. On the other hand, if the sender's scheduled message is scheduled to be delivered to the recipient at a time when the recipient selected a particular instance different from the instance requested by the sender, then a conflict may arise. Such conflicts and their resolutions are discussed below.

In various embodiments, processes for delivery and implementation of instance selections by a receiver or sender of a message (e.g., scheduled message) are performed by a wireless communications system. Specifically, one or more portions of the wireless communications system may perform the processes, independently of remote client devices of the sender or receiver. In some situations, however, an application residing on a remote client device (e.g., a mobile device) may be considered to be part of a wireless communications system. For example, such an application may be at least partially managed by the wireless communications system, which may provide various parameters to the application. The parameters may be provided from time to time or in response to the generation of a scheduled message, for example. The parameters may include assigned phone numbers, lists of devices (instances), and detailed information of the devices, just to list a few examples.

FIG. 1 is a block diagram of a system 100 for instance-based message delivery, according to various embodiments. A sending mobile device 102 may be a remote or wireless device, such as a client device of a wireless communications network 104, for example, and is identified as such in FIG. 1, though claimed subject matter is not so limited. The designation "sending" for 102 signifies that, in this example, 102 is the mobile device that is generating and transmitting a message to be received (possibly at a scheduled time) by a device assigned a receiving identifier 106, which may be a phone number. For example, the phone number may be assigned to a number of devices (e.g., instances) so that a message delivered to the phone number will generally be received by all the devices. Communication between sending mobile device 102 and a device assigned receiving identifier 106 may be implemented by a network server 108, which may comprise one or more servers in wireless communications network 104. Sending mobile device 102 may include a message generation module 110, which may be software, hardware, or a combination thereof. Sending mobile device 102 may include a message scheduling application programming interface (API) 112 that provides for a user (the "sender") of sending mobile device 102 to create and schedule a message for delivery to a device corresponding to receiving identifier 106. As described in detail below, message scheduling API 112 may provide a number of options to the sender, such as desired message delivery time, request for message delivery receipt, and selection of one or more recipients of the message, just to name a few examples. Additionally, in some embodiments, message scheduling API 112 or message generation module 110 may perform or manage instance requests by the sender. These are requests that messages be delivered to one or more selected instances 114A-114N (e.g., "114") of receiving identifier 106. Devices assigned receiving identifier 106 need not include components such as message generation module 110 or message scheduling API 112 but are assumed to be capable of receiving messages and implementing, at least in part, selection of instances. In particular, one or more devices assigned receiving identifier 106 may include an instance management API 116 that allows the user (e.g., client or owner) of the devices (instances) to select one or more (other) instances 114 for receiving messages. One of the instances assigned receiving identifier 106 may be a primary device. For example, the primary device, and no other instances, may include instance management API 116. Instance management API 116 may interact with network server 108, which may store and manage instance selections and perform message delivery in view of the selections. For example, by using instance management API 116, the user of one or more devices assigned receiving identifier 106 may select instance 114B for receiving messages. Instance management API 116 may provide this selection to network server 108, which may subsequently manage message delivery so that messages are delivered to the selected instance.

Sending mobile device 102 may be associated with a telecommunications service provider, such as wireless communications network 104, and may have a profile associated with a subscriber identity module (SIM) card of the mobile device that indicates associated subscriber account information or a communication address associated with the telecommunications service provider.

In detail, telecommunication devices, such as sending mobile device 102, may be associated with SIM cards that store personal information of respective customers. As explained below, receiving mobile device 106 need not include or be associated with a SIM card. A SIM card may be a portable memory chip or an embedded memory chip (eSIM). A SIM card associated with a telecommunication device can include data associated with a phone number of a customer associated with the telecommunication device, an address book of the client (e.g., customer), text messages sent and received via the telecommunication device, and other data. Generally, when a customer opens a service account associated with a telecommunication service provider, the telecommunication service provider can activate a SIM card of a telecommunication device associated with the service account of the consumer. That is, each SIM card includes a unique number on the memory chip requiring activation by the telecommunication service provider (e.g., via a website associated with the telecommunication service provider, via a call to the telecommunication service provider, etc.).

Embedded SIM (eSIM) cards are a relatively new generation of SIM cards that are embedded in devices, such as telecommunication devices. eSIM cards can have multiple applications, one which supports over the air provisioning of a profile which identifies the device in which the eSIM card is embedded to a telecommunications service provider. Currently, GSMA offers an eSIM remote provisioning specification which enables a profile on an eSIM card to be changed remotely without having to change the eSIM card itself.

In some embodiments, one or more devices corresponding to receiving identifier 106 need not include a SIM card. One or more of these devices may be an "over-the-top" (OTT) device, which is a device that can use services that may circumvent, at least in part, wireless communications network 104, for example. OTT devices may utilize access to the Internet 118 via an internet connection that is provided either locally or through a wireless communications network 104.

Figure 2:
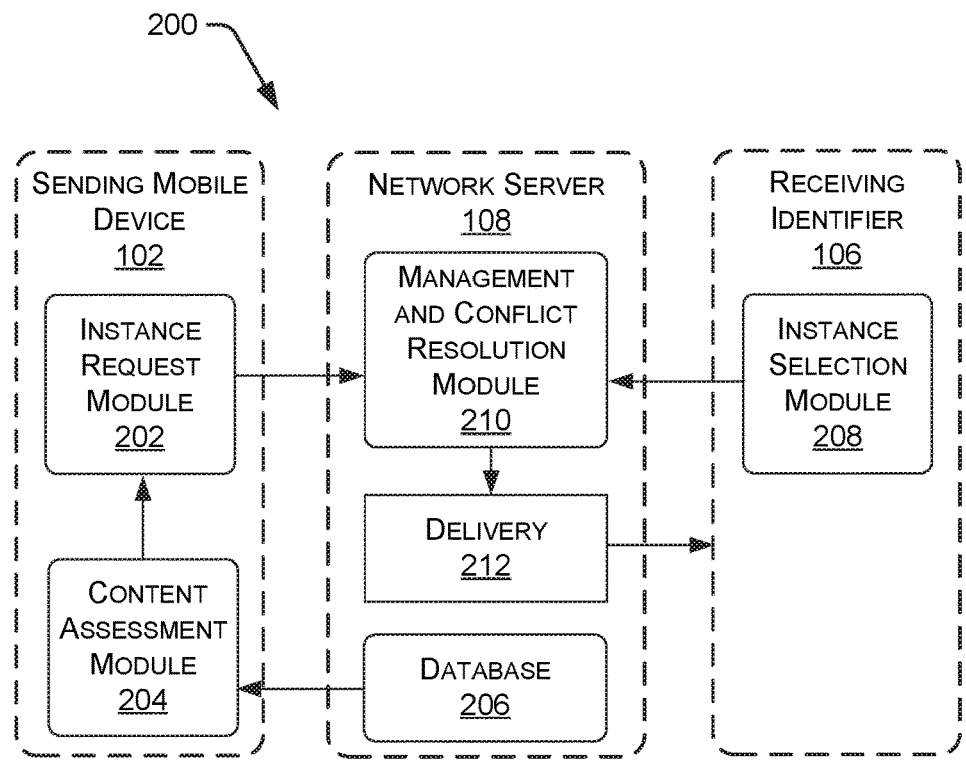
FIG. 2 schematically illustrates a delivery process for instance-based message delivery, according to some embodiments.

FIG. 2 schematically illustrates a delivery process 200 for an instance-based message delivery, according to some embodiments. Network server 108 may perform at least a portion of process 200, which may involve scheduled messages. Sending mobile device 102 may include an instance request module 202 that allows the sender (the user of sending mobile device 102) to request that a message, produced by message generation module 110, be delivered to a particular instance (e.g. 114) of receiving identifier 106. A content assessment module 204 may provide information regarding instances of receiving identifier 106. For example, content assessment module 204 may receive details from a database 206 of network server 108 regarding capabilities and other parameters of individual instances assigned receiving identifier 106. Database may maintain records of these instances and their specifications such as, for example, display parameters (e.g., resolution, size of display, video drivers, and so on), audio parameters (e.g., which may determine sound quality), memory size, or residing browsing applications, just to name a few examples. (In some embodiments, the client or user of receiving identifier 106 may opt-out of providing such information to network server 108). With such information from database 206, content assessment module 204 may determine which instance(s) of receiving identifier 106 are best-suited to receive video, audio, large files, and so on. These determinations may then be provided, in the form of recommendations, to instance request module 202, which may display the recommendations to the sender so that the sender may decide to which instance to send his/her message. For example, a message of the sender may include a video file, which the sender prefers the receiver to view on a relatively large display (e.g., as opposed to a small display of a cellular phone). Accordingly, the sender may request, via instance request module 202, that the message be delivered only to an instance of receiving identifier 106 that has a relatively large display.

On the other hand, the receiver (a user of receiving identifier 106) may select, via an instance selection module 208, an instance that is different from the instance requested by the sender. For such a conflict, a management and conflict resolution module 210 on network server 108 may resolve the conflict by giving priority to the selection by the receiver, or by delaying delivery of the message until the instance selected by the receiver matches that requested by the sender. In the latter case, network server 108 may send a notification to the receiver that informs the receiver about the impending message delivery and the request for the message to be received on the requested instance. In another implementation of the latter case, network server 108 may send a notification to the sender that informs the sender that the message could not be delivered to the requested instance. The sender may then change the request, schedule the message to be delivered at a later time (e.g., when the receiver has selected the sender's requested instance), or cancel the message delivery, just to list a few examples. Except for the case of the sender cancelling the message delivery, the conflict may be resolved and the message delivered (possibly at a future time or date), as at block 212.

Figure 3:
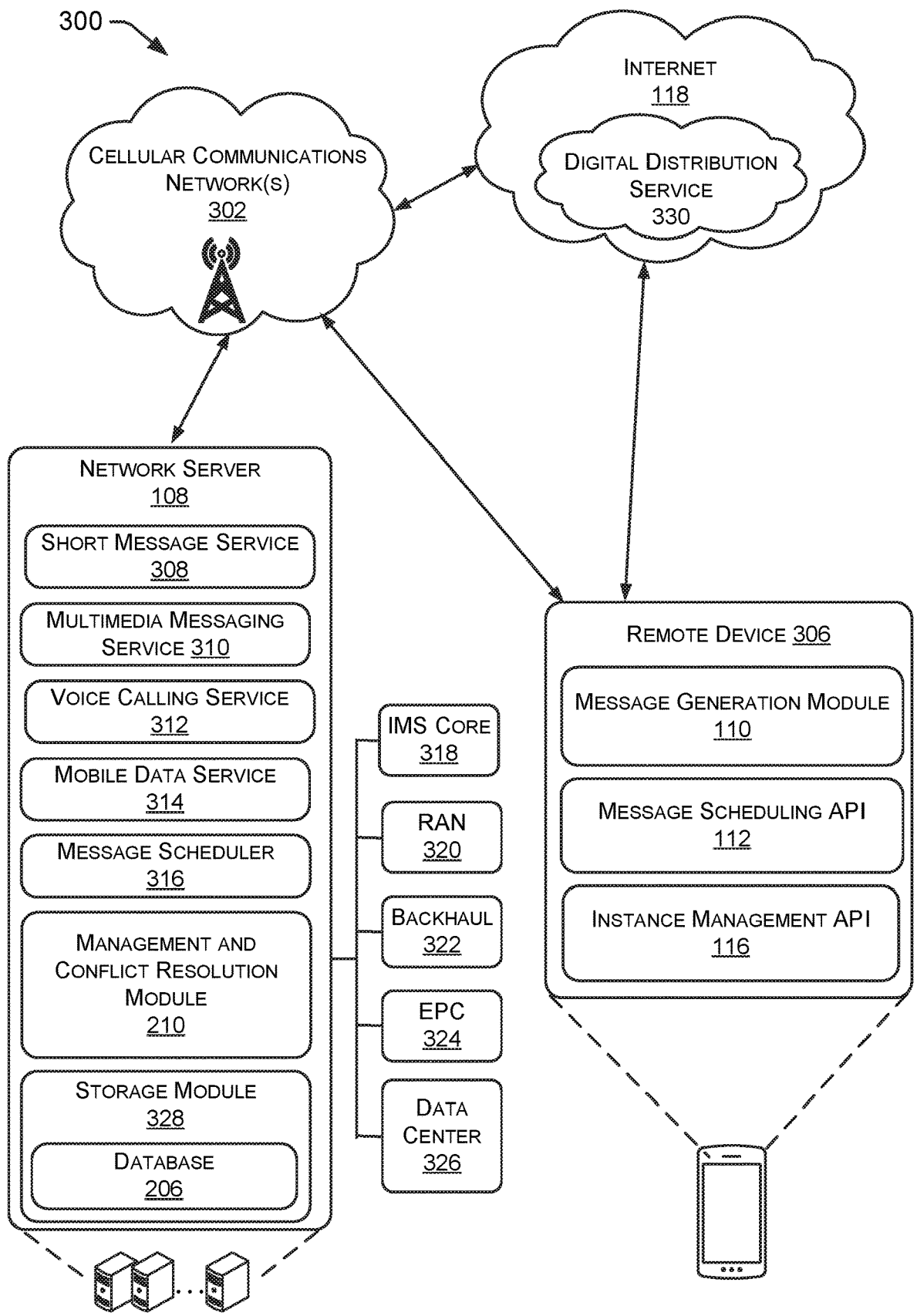
FIG. 3 schematically illustrates a system that includes a cellular communications network and the Internet, according to various embodiments.

FIG. 3 schematically illustrates a system 300 that includes cellular communications network(s) 302 and the Internet 118, according to various embodiments. System 300 provides an environment for a remote device 306, which may be the same as sending mobile device 102 or instance 114 of receiving identifier 106, to send or receive a message. Cellular communication network(s) 302 (e.g., "network 302") may include one or more cellular services providers, such as T-Mobile®, Verizon Wireless®, AT&T®, etc. Cellular communication network 302 may be the same as or similar to wireless communication network 104, illustrated in FIG. 1. Remote device 306 may communicate with one or more other electronic devices and/or systems via network 302. As described above, remote device 306 may include message generation module 110, message scheduling API 112, or instance management API 116.

Network server 108, introduced in FIG. 1, may comprise one or more servers and may provide operational equipment and infrastructure management in support of network 302. Network server 108 may provide back-end delivery and support of cellular network services including, for example, a short message service (SMS) 308, a multimedia messaging service (MMS) 310, a voice calling service 312, a mobile data service 314, and a message scheduler 316.

Network server 108 may include or communicate with various types of operational equipment that support the cellular communications network, such as servers, routers, firewalls, hubs, switches, and so forth. Many of the operational equipment elements communicate over a non-cellular IP (Internet Protocol) network for purposes of control and reporting. Functions of network server 108 may be facilitated by, for example, an IMS (IP Multimedia Subsystem) Core 318, a RAN (Radio Access Network) 320, a Backhaul 322, an EPC (Evolved Packet Core) 324, and a data center 326, which may include memory resources for storing scheduled messages waiting to be delivered. System 300 may include multiple instances of any of the illustrated network elements 318-326 and/or other elements that are not shown. System 300 may be distributed over a very large region, such as over an entire country or a portion of a country. System 300 may implement a GSM (global system for mobile communications) network, as one example.

Message scheduler 316, which may reside in network server 108, as illustrated, may include clock and calendar functions to be used to compare present time with scheduled times of schedule messages being stored in data center 326, for example. Network server 108 may include a storage module 328 that manages storage of scheduled messages and may (but need not) utilize data center 326 for storage functions. Storage module 328, which may include memory resources apart from data center 326, may include database 206, introduced in FIG. 2.

Network server 108 may include, as also illustrated in FIG. 2, management and conflict resolution module 210, which, in addition to resolving conflicts, as described above, may also manage instance requests and assignments for clients and their devices, such as remote device 306.

System 300 may include at least portions of the Internet 118, such as those portions (e.g., the Cloud) that include (mobile) applications executed in response to communication with mobile device 102. Internet 118 may include a digital distribution service (DDS) 330 that procures mobile applications, such as an on-line digital store. For example, DDS 330 may sell, share, or distribute any number of applications that may be downloaded to mobile device 102, such as all or portions of message generation module 110 or message scheduling API 112. In some embodiments, DDS 330 may include processors that execute applications (e.g., in the Cloud) during engagement with remote device 306, which may execute an associated application residing in remote device 306. For example, remote device 306, hosting message generation module 110 and message scheduling API 112, may utilize data storage and computing by servers in the Cloud.

Remote device 306 may be configured to communicate on network 302 using network services 308-316, depicted with respect to network server 108. Accordingly, remote device 306 may also include hardware and software supporting communications services such as a SMS, a MIMS, a voice calling service, and a mobile data service, among other wireless access technologies. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of wireless access technology.

Although various elements of FIG. 3 are shown and described as being discrete devices or components for purposes of discussion, any of the illustrated computing elements may, in practice, include one or more physical, virtual, or otherwise abstracted cluster or network of machines and/or devices. For example, although network server 308 may be depicted as a single entity, it may comprise any one or more computing devices, including physical devices and virtual computing units, and including network-based devices that are commonly referred to as being in the cloud. Moreover, although a single remote device (remote device 306) is depicted, it should be appreciated that system 300 may include any number and types of remote devices, and of such devices, remote device 306 is merely a singular non-limiting example.

Figure 4:
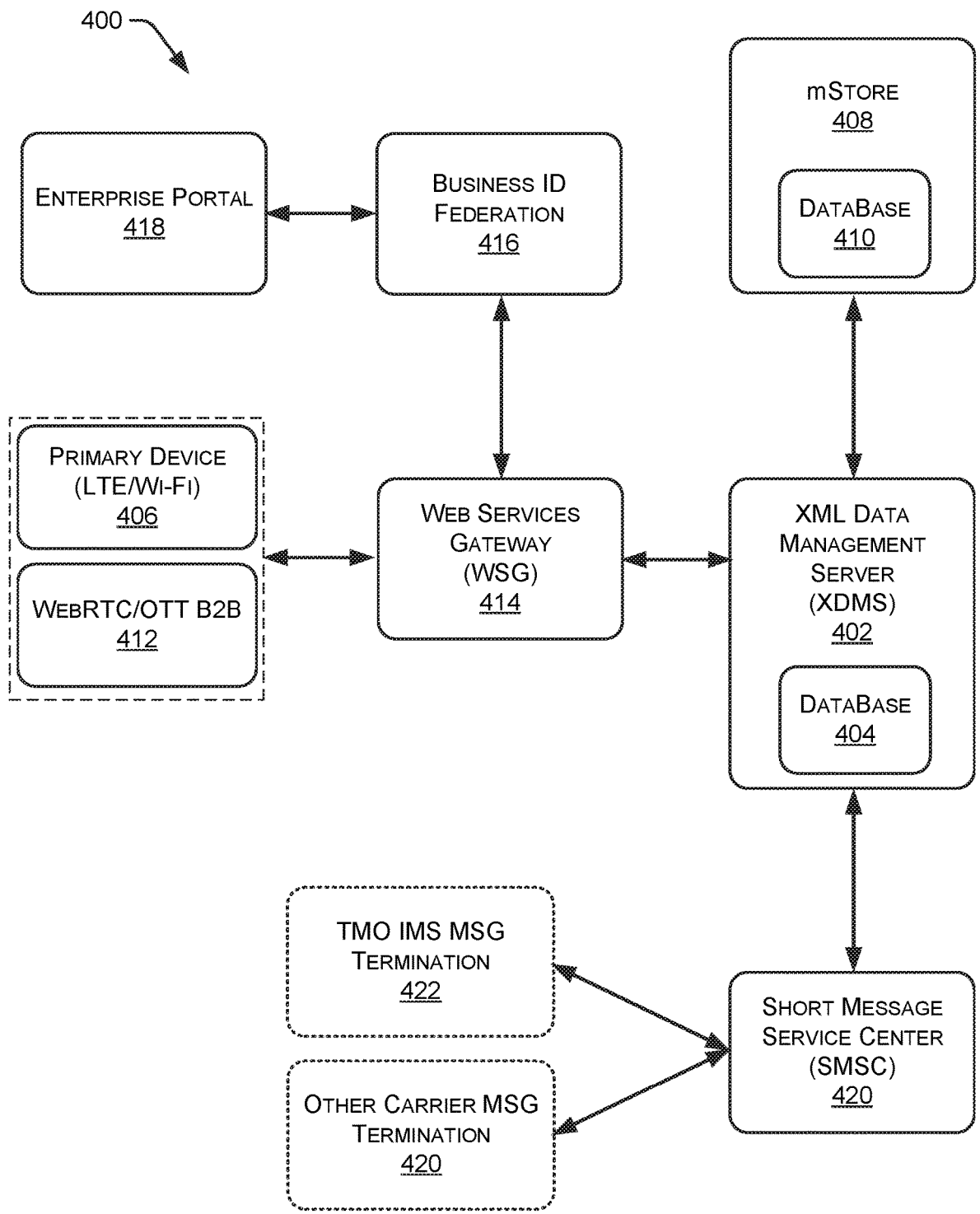
FIG. 4 schematically illustrates a system for instance-based message delivery, according to various embodiments.

FIG. 4 schematically illustrates a system 400 for instance-based message delivery, according to various embodiments. System 400 may implement scheduled messaging. Various OMA (Open Mobile Alliance) enablers such as Presence, Push to talk Over Cellular (PoC), Instant Messaging (IM), and so on, may have access to, and can manipulate, information that may be generally needed by these enablers. Such information may be expressed as XML documents and may be stored in various document repositories in a telecommunications network where such documents can be located, accessed and manipulated (e.g., created, changed, deleted) by authorized Principals. System 400 includes an XDMS (XML Data Management Server) 402, which is a server that stores data in a database 404 for the above OMA enablers. XDMS 402 may store personal contacts, group contacts, and company or enterprise contacts. For example, in "Digits", XDMS 402 may be used for personal contacts storage.

In various embodiments, XDMS 402 may expose APIs to create a contact address book and to add personal contacts to an address book of a client (e.g., customer). Address books may be created as part of a user onboarding process. Once onboarded, the user upon first login to an OTT application may be prompted to sync his/her local phone contacts to XDMS 402. This OTT application instance with a device ID may be marked as a primary device 406. All subsequent instances to which the user logs in may be treated as secondary devices. As part of the subsequent instance login process, the contacts from the primary device saved in XDMS 402 may be downloaded to ensure that all the contacts in primary and secondary instances are the same. Also, this downloading process may allow the secondary device to learn that there is a different primary device.

Any changes to the address book from the primary device in terms of personal contacts (e.g., Create, Update or Delete operations applied to any contact) may be sent as notifications from XDMS 402 to an mSTORE (message store) 408, which includes a database 410, and further down to all instances through a WebRTC Gateway 412, for example. All the secondary instances may always be in sync with primary instances in this way.

In some embodiments, instance-based scheduled message delivery is a feature for which users (e.g., end clients) can have a specific message delivered to a contact in the user's address book at a schedule time and delivered to a specific instance as determined by the message recipient (e.g., an instance 114 of receiving identifier 106). The message recipient may be logged into single or multiple devices (e.g., instances 114) and the recipient may determine to which instance he/she wants the message to be sent.

For example, the user may be able to send a scheduled message at a specific date and time for a contact in his address book. The recipient of the message in this case would determine on which instance to get the message. The recipient may set up his/her preference to have the message delivered on the last instance register or user-determined instance. Examples of scheduled messages include scheduled birthday wishes to be sent to a specific instance of the recipient, scheduled anniversary wishes to be sent to a specific instance of the recipient, or any scheduled messages to be sent to a specific instance of the recipient. In some implementations, the user may be able to record scheduled messages to be sent at a specific time with Apple Siri® or Google Voice®. In some implementations, the client may be an IOS® device, Android® device, Business Hub Connect®, and "Digits" OTT, for example.

Some embodiments of an instance-based scheduled message delivery feature may involve the following enhancements. For native and OTT clients: contacts worksheet may have the following fields: "Scheduled Message," which is a text string (e.g., up to about 512 characters); and "Scheduled Delivery Time Stamp," which is a schedule date and time for when the message is to be delivered (e.g., year-month-day-hour-minute-second format). Further enhancements may include an OTT client acting as a primary device that should have Create and Update options for "Schedule Message" and "Schedule Timestamp" options; if an OTT client is marked as a secondary device, it may have only a "Read" option for the user; and an OTT client may display an option for the user to choose whether to select a user-determined instance for scheduled message delivery.

In some embodiments, system 400 may include an OTT-Web Services Gateway (WSG) 414, interconnected with a business ID federation 416 (e.g., which may link clients' electronic identity and attributes that are stored across multiple distinct identity management systems) and an enterprise portal 418, for example. API's for WSG 112 and XDMS 402 may include the following features: Create and Update Contacts to have the following field: Scheduled Message and Scheduled Delivery Timestamp. Other features may include enhanced APIs to delete the Scheduled Message or Scheduled Delivery TimeStamp; and for selecting a specific OTT client or Web Client Instance, if the user has set an option "Instance for Schedule Delivery."

In some embodiments, XDMS 402 may include the following enhancements: a short message peer-to-peer (SMPP) interface introduced to deliver scheduled message; XDMS enhancement to access XDMS database 404 for scheduled message and timestamp to send out the message; SMSC data fill to set up new peers; XDMS notification to be sent on the Create, Update and Delete operations applied to the scheduled message; and XDMS database 404 to store the scheduled message and schedule delivery timestamp. If the timestamp is past due, the message may be treated as old and discarded or returned to sender as undeliverable. If the message field is empty, the delivery timestamp may be ignored. If the SMPP interface receives a timeout or error response, a predetermined number of retries may be performed.

In some implementations, XDMS 402 maintains user and instance ID mapping for scheduled message delivery if the user determined instance is selected. If the recipient has set a "User Determined" flag, during the message delivery the device instance may be sent to an SMSC 420. Subsequently, for TMO-based recipients 422 (e.g., T-Mobile recipients) or other carrier recipients 424, a Rich Messaging Server (RMS), which is a 3GPP/GSMA standard RCS Server, may perform MT (mobile terminated) Termination to this specific instance ID. If the recipient has not set the "User Determined" option for scheduled delivery, RMS may fork the message to the last registered instance.

In some embodiments, XDMS 402 may implement executable code to send out scheduled messages at a scheduled timestamp. For example, when the scheduled timestamp matches an XDMS system time, the scheduled message may be sent out to the contact (e.g., recipient) via the SMPP interface to SMSC 420, which includes executable code to determine (e.g., based on a centralized or converged subscriber database (CDB)) if the user is a client of one carrier (e.g., T-Mobile) or another carrier.

Figure 5:
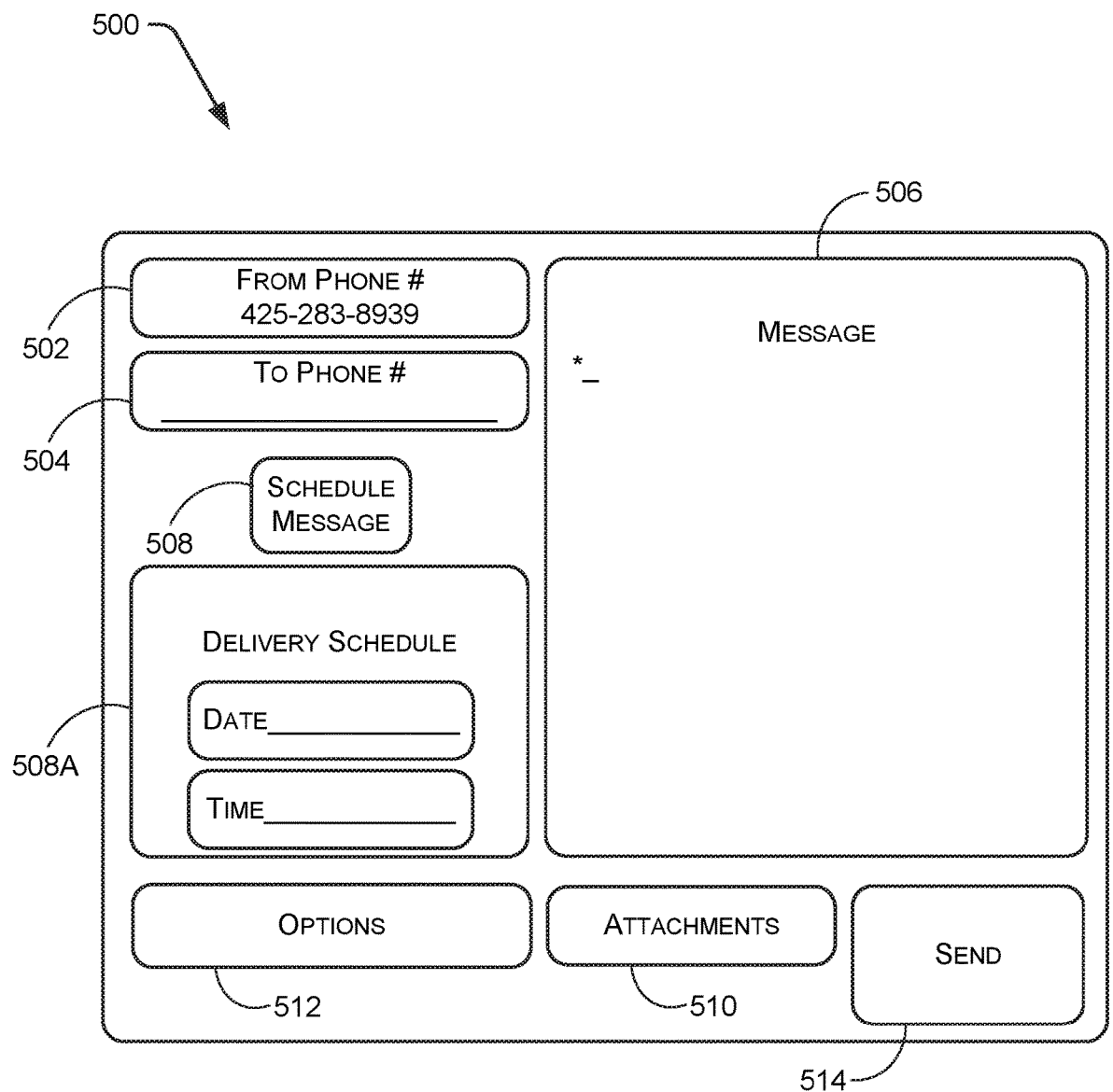
FIG. 5 represents an example display of an application programming interface for generating a message, according to some embodiments.

FIG. 5 represents an example display 500 of an application programming interface for generating a message on a remote device, such as sending mobile device 102, according to some embodiments. Display 500 includes field 502 that identifies the phone number associated with the mobile device (or other computing device) used to generate the message. Field 504 prompts a user of the mobile device for the phone number of the device(s) to where the message is to be sent. In some implementations, more than one device, or instance, may be assigned the phone number. In other words, the user may send the message to more than one instance of a particular phone number. Field 506 may be a text-editable field for entering text for the message. A button 508 provides the user an option of scheduling the message to be delivered to the recipient at a particular time, which may be entered in field 508A, prompting the user for a delivery date and time. In some implementations, a holiday or other calendar event can be entered in field 508A. For example, Christmas or other holiday, a birthday, or an anniversary can be selected or entered in field 508A as the day for delivery of the scheduled message. In some embodiments, delivery time may be automatically populated into field 508A based on a calendar of events residing in a memory of the mobile device. For example, a calendar of the user may be annotated with holidays, birthdays, or anniversaries. Message scheduling API 112 may assess such annotations of the calendar and automatically generate a scheduled message. For a particular example, the calendar may be annotated to mark January 17 as a birthday for Alexis. Accordingly, API 112 may automatically generate a message with the text "Happy Birthday Alexis!" to be scheduled for delivery on the next (and subsequent) January 17.

Selection of a button 510 may prompt the user to add various types of attachments, such as photos, videos, MP3s, files, or web links, just to name a few examples. Selection of a button 512 may provide the user with various options, such as whether the user wants to require a response from an intended recipient prior to sending a scheduled message, whether the user wants a delivery receipt, whether the user wants to send the message to a particular instance of the intended recipient, and so on. Another option may be that a notification of the existence of an impending scheduled message is sent (at the scheduled time) to the intended recipient prior to transmitting the message to the recipient. In this case, the scheduled message is sent (at the scheduled time) only after the user or network server 108 receives permission from the intended recipient. Finally, button 514 prompts the user to send the message.

In some embodiments, attachments added (via a field (not illustrated) prompted to be displayed by button 510) by the user may initiate at least a portion of process 200. In particular, content assessment module 204 may evaluate capabilities or other specifications of instances of the intended receiver (e.g., identified by the phone number entered in field 504) in view of the attachments added by the user. Resulting from this evaluation, selection of the options button 512 may list one or more recommendations for which of a receiver's instances are best-suited to receive the message with the particular type of attachment(s) that the user has chosen to attach to the message. Thus, the user may be given an opportunity to request that the message be delivered to a particular instance of the receiver. In some examples, options may also include selection of what happens to delivery of the message if the user-requested instance of the receiver is turned off or if the receiver has selected a different instance to receive messages during a timespan that includes the delivery time for when the message is to be delivered. Delivery options may include waiting until that instance is on and available to deliver the message, sending to any available instance, or cancelling message delivery, just to name a few examples.

Figure 6:
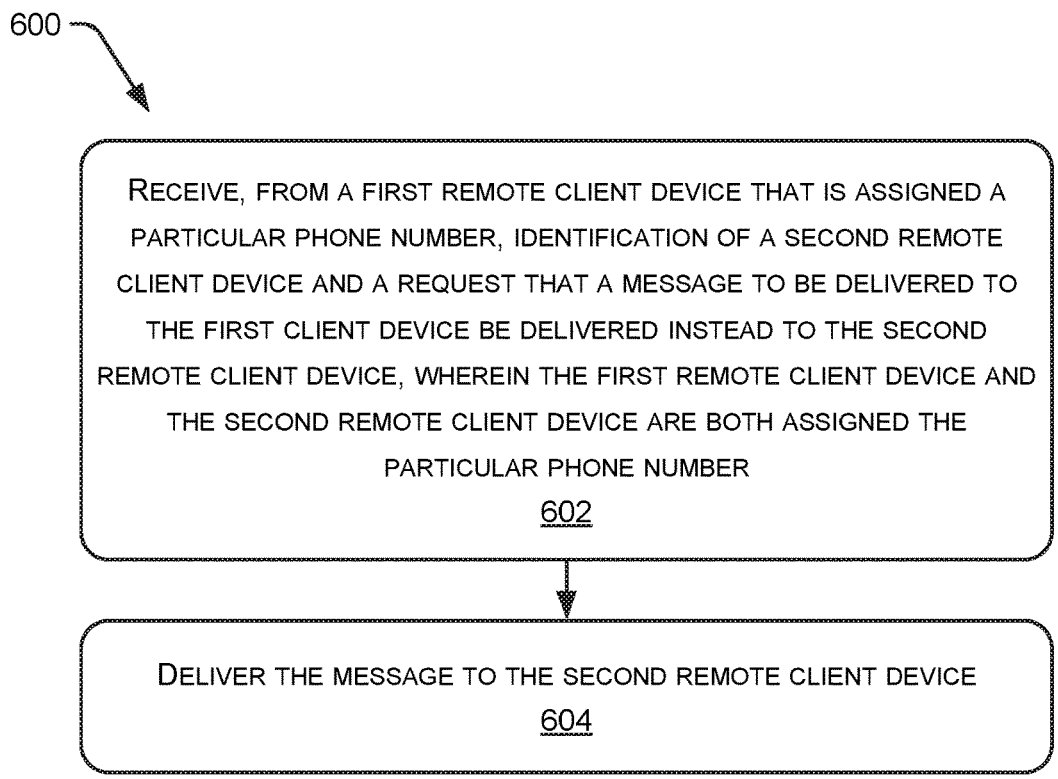
FIG. 6 is a flow diagram of a process for instance-based message delivery, according to some embodiments.

FIG. 6 is a flow diagram of a process 600 for instance-based message delivery, according to some embodiments. In some examples, process 600 may be performed by network server 108 of wireless communications network 104. In other examples, process 600 may be performed by sending mobile device 102.

The implementation of the various components described herein is a matter of choice dependent on the performance and other requirements of computing system involved. Accordingly, logical operations described herein may be referred to as operations, structural devices, acts, processes, or modules. These operations, structural devices, acts, processes, and modules can be implemented in software, in firmware, in special purpose digital logic, and any combination thereof. More or fewer operations can be performed than shown in the figures and described herein. These operations can also be performed in parallel, or in a different order than described herein. Some or all of these operations might also be performed by components other than those specifically identified. As mentioned above, process 600 may be performed in part by network server 108 or sending mobile device 102. In the example illustrated below, network server 108 is considered to be performing process 600, though claimed subject matter is not so limited.

At 602, network server 108 may receive, from a first remote client device that is assigned a particular phone number, identification of a second remote client device. The first and the second remote client devices may each be an instance 114, for example. The first remote client device or the second remote client device may be an over-the-top (OTT) client device. Moreover, the first remote client device may be a primary device, such as 406, illustrated in FIG. 4. Network server 108 may also receive a request that a message to be delivered to the first client device be delivered instead to the second remote client device. In the case of instances, the first remote client device and the second remote client device are both assigned the particular phone number. For example, the message may be created by a user of a sending remote client device in field 506 of display 500, a delivery time for when the message is to be delivered may be selected by the user in field 508A, and the recipient delivery address may be selected or entered in field 504. The recipient delivery address may be represented by a phone number, which may be in a contacts database (e.g., an address book) on the sending remote client device. In some implementations, as described above, the delivery time for when the message is to be delivered is defined by a calendar date and time of day, or a holiday or personal event of a user associated with the recipient delivery address. In other implementations, the delivery time is based, at least in part, on a calendar event stored on the primary remote client device.

At 604, network server 108 may deliver the message to the second remote client device. In some implementations, network server 108 may broadcast to any client device (e.g., any instance), including the first remote client device and the second remote client device, that is assigned the particular phone number, an indication that the message was transmitted to the second remote client device. For example, if one instance receives the message, other instances may be notified about the received message.

Figure 7:
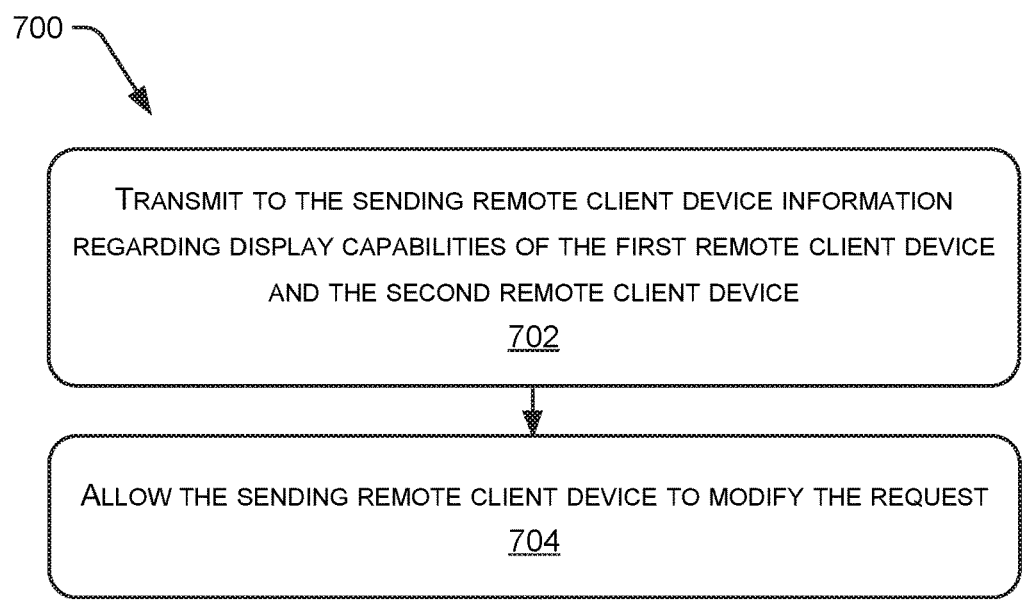
FIG. 7 is a block diagram of a process for another aspect of instance-based message delivery, according to various embodiments.

FIG. 7 is a block diagram of a process 700 for another aspect of instance-based message delivery, according to various embodiments. Process 700 may be implemented, for example, in a situation where the user of the sending remote client device may request an option (e.g., via button 512) to request the message be delivered to an instance that is different from the instance selected by the receiver.

At 702, network server 108 may transmit to the sending remote client device information regarding display capabilities of the first remote client device and the second remote client device. For example, database 206 of network server 108 may store such information that may be provided to content assessment module 204 of the sending remote client device (e.g., sending mobile device 102). At 704, network server 108 may allow the sending remote client device to modify the request of the receiver based on display capabilities of the first remote client device and the second remote client device. In some implementations, the message is a scheduled message specified to be delivered at a delivery time defined by a calendar date or time of day. In some implementations, the message is a scheduled message specified to be delivered at a delivery time defined by a holiday or personal event of a user associated with the particular phone number. In some implementations, XDMS 402 may be used to compare a system time of network server 108 to the delivery time. XDMS 402 may comprise one or more processors of network server 108, for example. XDMS 402 may transmit the message to the second remote client device via SMSC 420, for example.

Figure 8:
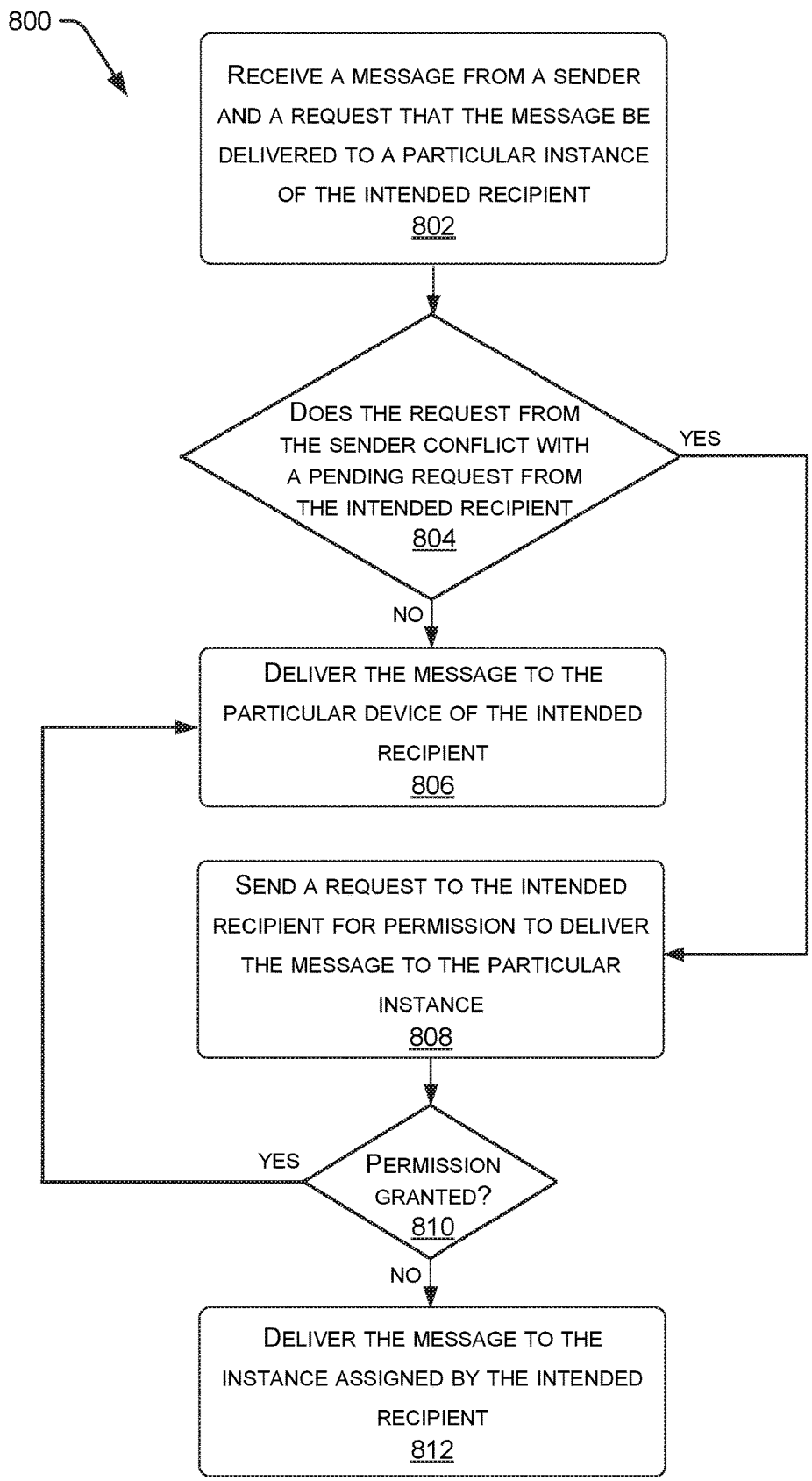
FIG. 8 is a block diagram of a process that includes conflict resolution for instance-based message delivery, according to various embodiments.

FIG. 8 is a block diagram of a process 800 that includes conflict resolution for instance-based message delivery, according to various embodiments. For example, management and conflict resolution module 210 of network server 108 may perform at least portions of process 800. At 802, network server 108 may receive a message from a sender and a request that the message be delivered to a particular instance (e.g., device) of the intended recipient. At 804, management and conflict resolution module 210 may determine whether the request from the sender conflicts with a pending request from the intended recipient. If not, then process 800 may proceed to 806 where network server 108 delivers the message to the particular instance of the intended recipient. On the other hand, if there is a conflict, then process 800 advances to 808 where network server 108 may send a request to any instance of the intended recipient for permission to deliver the message to the particular instance. At 810, network server 108 may determine if such permission has been granted. If so, then process 800 may proceed to 806 where network server 108 delivers the message to the particular instance of the intended recipient. On the other hand, if permission is not granted, then process 800 advances to 812 where network server 108 may deliver the message to the instance assigned by the intended recipient.

Figure 9:
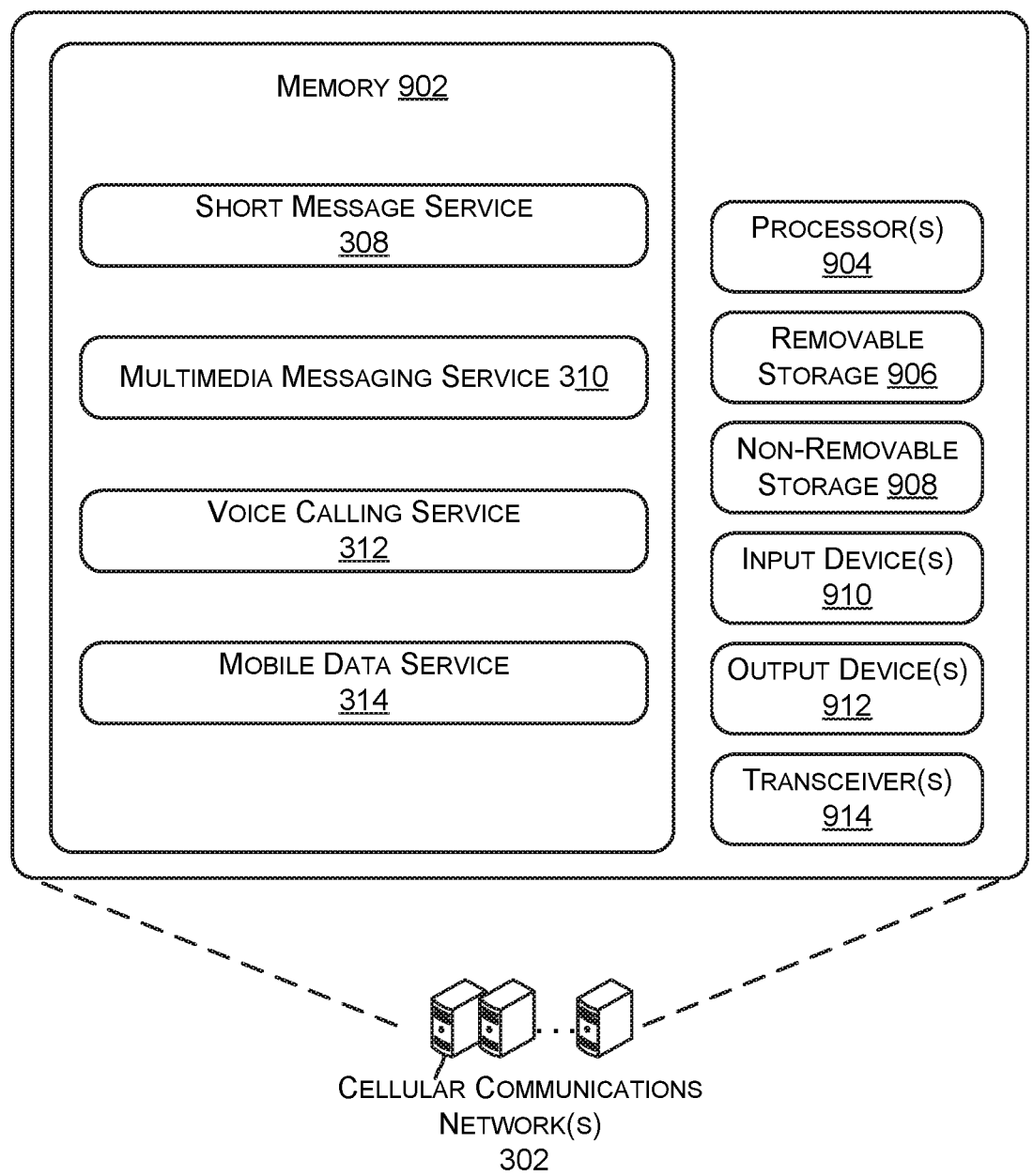
FIG. 9 is a block diagram of a network server, according to various embodiments.

FIG. 9 is a block diagram of network server 108 of a network 302, first illustrated in FIG. 3, configured to operate with mobile device 102 that includes message generation module 110 and message scheduling API 112 residing on mobile device 102, according to various embodiments. For example, network 302 may be used to implement the various operations described herein. Network 302 may be implemented as a single device or as a plurality of devices with modules and data distributed among them. Network 302 may include memory 902 storing executable code and data for SMS 308, MMS 310, voice calling service 312, and mobile data service 314, as described herein. Network 302 includes one or more processor(s) 904, a removable storage 906, a non-removable storage 908, input device(s) 910, output device(s) 912, and transceiver(s) 914.

In various embodiments, memory 902 may be volatile (such as RAM), non-volatile (such as ROM, flash memory, etc.), or some combination thereof. SMS 308, MMS 310, voice calling service 312, and mobile data service 314 may comprise methods, threads, processes, applications, or any other sort of executable instructions. SMS 308, MMS 310, voice calling service 312, and mobile data service 314 may also include files and databases (not illustrated) storing values associated with expected or nominal settings, values, etc., for the various services described. Various details of SMS 308, MMS 310, voice calling service 312, and mobile data service 314 are provided above in the discussion of FIG. 3.

In some embodiments, one or more processor(s) 904 are central processing units (CPUs), graphics processing units (GPUs), or both CPU and GPU, or other processing units or components known in the art.

Network(s) 302 may include additional data storage devices (removable and/or non-removable) such as, for example, magnetic disks, optical disks, or tape. Such additional storage is illustrated in FIG. 9 by removable storage 906 and non-removable storage 908. Tangible computer-readable media can include volatile and non-volatile, removable and non-removable media implemented in any method or technology for storage of information, such as computer readable instructions, data structures, program modules, or other data. Memory 902, removable storage 906, and non-removable storage 908 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by network 302. Any such tangible computer-readable media can be part of network 302.

Network 302 also can include input device(s) 910 such as a keypad, a cursor control, a touch-sensitive display, voice input device, etc., and output device(s) 912 such as a display, speakers, printers, haptic feedback, etc.

As illustrated in FIG. 9, network 302 may also include one or more wired or wireless transceiver(s) 914. Transceiver(s) 914 can include a network interface card (NIC), a network adapter, a LAN adapter, or a physical, virtual, or logical address to connect to cellular network(s), Wi-Fi network(s), OEM server(s), and mobile devices 102 and 106, for example. To increase throughput when exchanging wireless data, transceiver(s) 914 can utilize multiple-input/multiple-output (MIMO) technology. Transceiver(s) 914 may embody any sort of wireless transceiver device capable of engaging in wireless, radio frequency (RF) communication. Transceiver(s) 914 may also include other wireless modems, such as a modem for engaging in Wi-Fi, WiMAX, Bluetooth, or infrared communication.

Figure 10:
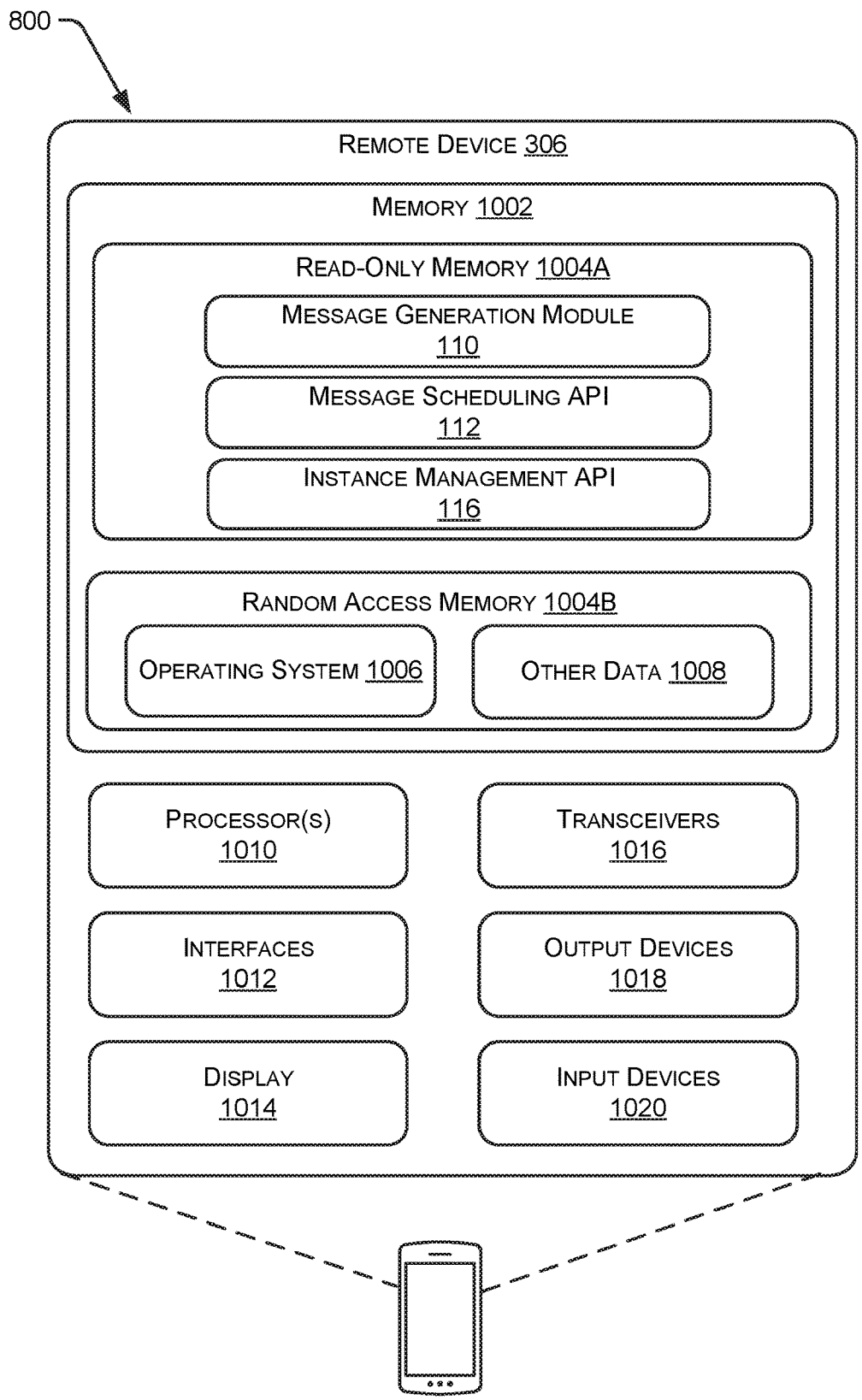
FIG. 10 is a block diagram of a mobile device, according to various embodiments.

FIG. 10 is a block diagram of remote device 306 and illustrates a component level view of remote device 306 configured with message generation module 110, according to various embodiments. Remote device 306 may include a system memory 1002 that includes ROM 1004A and RAM 1004B. ROM 1004A may store message generation module 110, which may comprise one or more individual applications, and may store message scheduling API 112. For example, message generation module 110 may comprise code executable by remote device 306 to perform message scheduling processes, as described above. ROM 1004A may also store instance management API 116.

In some examples, message generation module 110 may be configured to work with various services on network 302, such as, for example, a short message service (SMS), a multimedia messaging service (MMS), a voice calling service, and a mobile data service, which may communicate with and or otherwise share information with corresponding services on network 302 including SMS 308, MMS 310, voice calling service 312, and/or mobile data service 314. For example, message generation module 110 may use such services to communicate to mobile device 102 or instances of receiving identifier 106.

RAM 1004B may include working memory that stores information such as an operating system 1006 and other data 1008. Other data 1008 may include application(s) such as voice calling clients, VoLTE calling clients, Wi-Fi calling clients, messaging applications, email applications, media player applications, video calling applications, video chat applications, web browsers, social media applications, any sort of real-time communication applications, or any other sort of applications. The application(s) embodied as other data 1008 may engage in communication with other applications, servers, or devices via a communication link over a network (e.g., the cellular network(s) 302, the Internet, and/or Wi-Fi network(s), sending and receiving data packets.

ROM 1004A and RAM 1004B can include non-transitory computer-readable media (which may be non-volatile and volatile, respectively), and may include removable and non-removable tangible, physical media implemented in technology for storage of information, such as computer readable instructions, data structures, program modules, or other data. System memory 1002 (and removable storage 906 and non-removable storage 908 as illustrated in FIG. 9) are examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by remote device 306. Any such non-transitory computer-readable media may be part of remote device 306, network 302, and/or other components of system 300.

Remote device 306 may further include processor(s) 1010 which, in some implementations, may be one or more central processing units (CPUs), graphics processing units (GPUs), or both CPUs and GPUs, or any other sort of processing unit.

Remote device 306 may further include one or more interfaces 1012, a display 1014, transceivers 1016, output device(s) 1018, and input device(s) 1020. In some implementations, transceivers 1016 may include radios and/or modems, or combinations thereof known in the art. For example, transceivers 1016 may include one or more radio transceivers that performs the function of transmitting and receiving radio frequency communications via an antenna (not shown). The radios and/or modems may facilitate wireless connectivity between remote device 306 and various devices or one or more networks (e.g., 302). In addition, transceivers 1016 may include a near field antenna for communicating over unlicensed wireless IP networks, such as local wireless data networks and personal area networks (e.g., Bluetooth or near field communication (NFC) networks). Further, transceivers 1016 may include wired communication components, such as an Ethernet port, that connect remote device 306 in a wired fashion to devices of one or more networks. In various implementations, transceivers 1016 may interface with and be controlled by a radio chipset (not shown).

In some implementations, output devices 1018 include any sort of output devices known in the art, such as a display (e.g., a liquid crystal display), speakers, a vibrating mechanism, or a tactile feedback mechanism. Output devices 1018 also include ports for one or more peripheral devices, such as headphones, peripheral speakers, or a peripheral display.

In various implementations, input device(s) 1020 include any sort of input devices known in the art. For example, input device(s) 1020 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A wireless communication network, comprising:
one or more processors;
a non-transitory storage medium; and
instructions stored in the non-transitory storage medium, the instructions being executable by the one or more processors to:
receive, from a first remote client device that is assigned a particular phone number, identification of a second remote client device and a request that a message to be delivered to the first client device be delivered instead to the second remote client device, wherein the first remote client device and the second remote client device are both assigned the particular phone number, and wherein the message originates from a sending remote client device;
allow the sending remote client device to modify the request based on display capabilities of the first remote client device and the second remote client device; and
deliver the message to the second remote client device.

2. The wireless communication network of claim 1, wherein the request specifies a time or time span for when the request is to be implemented.

3. The wireless communication network of claim 1, wherein the instructions are further executable by the one or more processors to transmit to the sending remote client device information regarding the display capabilities of the first remote client device and the second remote client device.

4. The wireless communication network of claim 1, wherein the message is a scheduled message specified to be delivered at a delivery time defined by a calendar date or time of day.

5. The wireless communication network of claim 4, wherein an XML document management system (XDMS) compares a system time to the delivery time, and wherein the XDMS comprises the one or more processors.

6. The wireless communication network of claim 5, wherein the XDMS transmits the message to the second remote client device via a short message service center (SMSC).

7. The wireless communication network of claim 1, wherein the message is a scheduled message specified to be delivered at a delivery time defined by a holiday or personal event of a user associated with the particular phone number.

8. The wireless communication network of claim 1, wherein the first remote client device or the second remote client device is an over-the-top (OTT) client device.

9. The wireless communication network of claim 1, wherein the instructions are further executable by the one or more processors to broadcast to any client device, including the first remote client device and the second remote client device, that is assigned the particular phone number, an indication that the message was transmitted to the second remote client device.

10. One or more non-transitory computer-readable media storing computer-executable instructions that, when executed by one or more processors of a network element, cause a flow controller of the network element to perform operations, comprising:
receiving, from a first remote client device that is assigned a particular phone number, identification of a second remote client device and a request that a message to be delivered to the first client device be delivered instead to the second remote client device, wherein the first remote client device and the second remote client device are both assigned the particular phone number, and wherein the message originates from a sending remote client device;
causing the flow controller of the network element to allow the sending remote client device to modify the request based on display capabilities of the first remote client device and the second remote client device; and
delivering the message to the second remote client device.

11. The one or more non-transitory computer-readable media of claim 10, wherein the request specifies a time or time span for when the request is to be implemented.

12. A computer-implemented method comprising:
receiving, from a first remote client device that is assigned a particular phone number, identification of a second remote client device and a request that a message to be delivered to the first client device be delivered instead to the second remote client device, wherein the first remote client device and the second remote client device are both assigned the particular phone number, and wherein the message originates from a sending remote client device;
allowing the sending remote client device to modify the request based on display capabilities of the first remote client device and the second remote client device; and
delivering the message to the second remote client device.

13. The computer-implemented method of claim 12, wherein the request specifies a time or time span for when the request is to be implemented.

14. The computer-implemented method of claim 12, further comprising:
transmitting to the sending remote client device information regarding the display capabilities of the first remote client device and the second remote client device.

* * * * *